(12) United States Patent
Engel et al.

(10) Patent No.: US 10,107,328 B2
(45) Date of Patent: Oct. 23, 2018

(54) APPARATUS AND METHOD FOR AN ACTUATOR MOUNTING ASSEMBLY WITH A PIVOTING PLATE

(71) Applicant: Kolberg-Pioneer, Inc., Yankton, SD (US)

(72) Inventors: Gary Engel, Yankton, SD (US); Joe Rust, Yankton, SD (US)

(73) Assignee: Kolberg-Pioneer, Inc., Yankton, SD (US)

( * ) Notice: Subject to any disclaimer, the term of this patent is extended or adjusted under 35 U.S.C. 154(b) by 185 days.

(21) Appl. No.: 15/218,389

(22) Filed: Jul. 25, 2016

(65) Prior Publication Data

US 2017/0023175 A1    Jan. 26, 2017

Related U.S. Application Data

(60) Provisional application No. 62/196,954, filed on Jul. 25, 2015.

(51) Int. Cl.
| | |
|---|---|
| *F16M 11/10* | (2006.01) |
| *F16C 11/04* | (2006.01) |
| *B02C 1/04* | (2006.01) |

(52) U.S. Cl.
CPC .............. *F16C 11/04* (2013.01); *B02C 1/04* (2013.01)

(58) Field of Classification Search
USPC ............ 248/648, 651, 652, 658, 666, 284.1, 248/291.1, 292.12, 292.13
See application file for complete search history.

(56) References Cited

U.S. PATENT DOCUMENTS

| | | | | |
|---|---|---|---|---|
| 4,807,935 A | * | 2/1989 | King ...................... | B60N 2/767 297/411.38 |
| 5,678,896 A | * | 10/1997 | Chung ..................... | A47C 1/03 248/284.1 |
| 6,116,557 A | * | 9/2000 | Choy .................. | A47B 21/0314 108/93 |
| 6,397,763 B1 | * | 6/2002 | Panzarella ......... | A47B 21/0314 108/138 |
| 6,398,176 B1 | * | 6/2002 | Liu ..................... | A47B 21/0314 108/136 |
| 6,450,467 B2 | * | 9/2002 | Timm ................ | A47B 21/0314 108/69 |
| 6,517,040 B1 | * | 2/2003 | Wen ........................ | F16C 11/10 248/278.1 |

(Continued)

*Primary Examiner* — Terrell L McKinnon
*Assistant Examiner* — Michael McDuffie
(74) *Attorney, Agent, or Firm* — Chambliss, Bahner & Stophel, P.C.

(57) ABSTRACT

An actuator mounting assembly comprising a base mounted to an item of equipment and having a pivoting plate hole and a locking pin hole, a pivoting plate having a base hole, a locking pin hole, and a actuator hole, a base pin disposed in the pivoting plate base hole, a locking pin adapted to be removably disposed in the pivoting plate locking pin hole, and an actuator pin disposed in the actuator hole. The pivoting plate is pivotally connected to the base at the pivoting plate hole, the cap end of the actuator is pivotally connected to the pivoting plate at the actuator hole, the piston end of the actuator is pivotally connected to the item of equipment, and the base locking pin hole and the pivoting plate locking pin hole are aligned when the locking pin is inserted therethrough.

20 Claims, 10 Drawing Sheets

(56) References Cited

U.S. PATENT DOCUMENTS

| | | | | |
|---|---|---|---|---|
| 6,533,237 | B1* | 3/2003 | Matusek | A45B 11/00 248/291.1 |
| 6,786,461 | B1* | 9/2004 | Tsai | A47B 21/0371 248/118.3 |
| 7,290,744 | B2* | 11/2007 | Baldasari | A63B 63/083 248/123.11 |
| 8,317,152 | B1* | 11/2012 | Zhou | F16M 11/041 248/122.1 |
| 2004/0084587 | A1* | 5/2004 | Oddsen | F16M 11/10 248/284.1 |
| 2004/0238705 | A1* | 12/2004 | Scott | A47B 21/0314 248/284.1 |
| 2004/0262477 | A1* | 12/2004 | Whitaker | A47B 21/0314 248/284.1 |
| 2006/0175500 | A1* | 8/2006 | Liu | A47B 21/034 248/284.1 |
| 2012/0193495 | A1* | 8/2012 | Sugiyama | H04N 1/00493 248/292.12 |
| 2016/0053937 | A1* | 2/2016 | Smith | F16B 2/08 248/226.11 |
| 2016/0184048 | A1* | 6/2016 | Ge | A61B 90/50 248/284.1 |

* cited by examiner

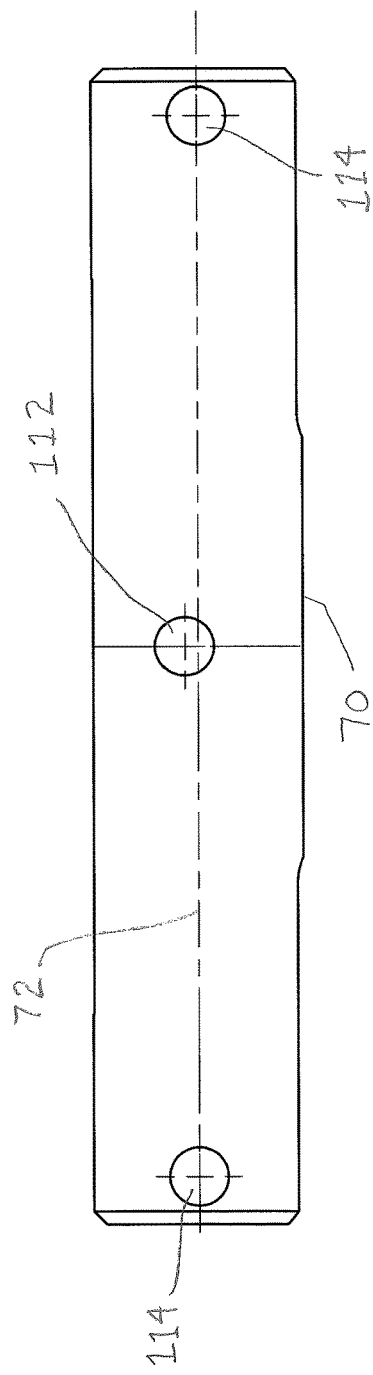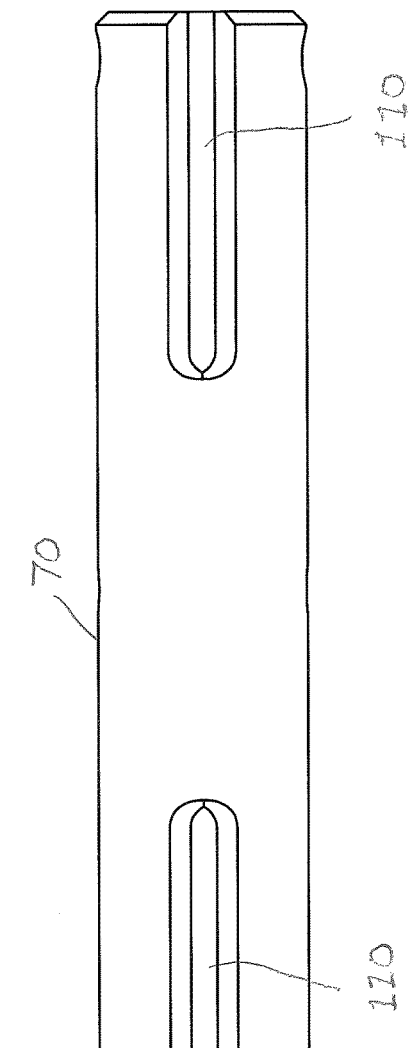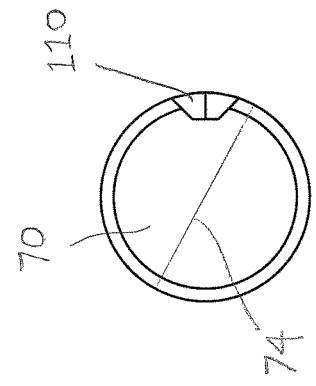
FIGURE 7B
FIGURE 7
FIGURE 7A

APPARATUS AND METHOD FOR AN ACTUATOR MOUNTING ASSEMBLY WITH A PIVOTING PLATE

CROSS-REFERENCES TO RELATED APPLICATIONS/PATENTS

This application relates back to and claims the benefit of priority from U.S. Provisional Application for Patent Ser. No. 62/196,954 titled "Tension System" and filed on Jul. 25, 2015.

FIELD OF THE INVENTION

The present invention relates generally to apparatuses and methods for mounting actuators, and particularly to apparatuses and methods for plate assemblies for mounting actuators to rock crushers.

BACKGROUND AND DESCRIPTION OF THE PRIOR ART

It is known to use a variety of apparatuses and methods for mounting actuators to items of equipment such as rock crushers. Conventional apparatuses and methods, however, suffer from one or more disadvantages. For example, conventional apparatuses and methods for mounting actuators use plate assemblies that result in undesirable failures and have an undesirably short lifespan. Conventional apparatuses and methods for mounting an actuator are also not adapted to function as both a tension system with an uncrushable release and a pitman servicing system. Conventional apparatuses and methods for mounting an actuator are also undesirably complex, expensive, and difficult to service.

It would be desirable, therefore, if an apparatus and method for mounting an actuator could be provided that would minimize, if not eliminate, failures and have a longer lifespan. It would be further desirable if such an apparatus and method for mounting an actuator could be provided that would function as both a tension system with an uncrushable release and a pitman service system. It would be still further desirable if such an apparatus and method for mounting an actuator could be provided that would be less complex, less expensive, and less difficult to service.

ADVANTAGES OF THE PREFERRED EMBODIMENTS OF THE INVENTION

Accordingly, it is an advantage of the preferred embodiments of the invention claimed herein to provide an apparatus and method for mounting an actuator that minimizes, if not eliminates, failures and has a longer lifespan. It is also an advantage of the preferred embodiments of the invention claimed herein to provide an apparatus and method for mounting an actuator that is adapted to function as both a tension system with an uncrushable release and a pitman service system. It is another advantage of the preferred embodiments of the invention claimed herein to provide an apparatus and method for mounting an actuator that is less complex, less expensive, and less difficult to service.

Additional advantages of the preferred embodiments of the invention will become apparent from an examination of the drawings and the ensuing description.

SUMMARY OF THE INVENTION

The apparatus of the invention comprises a mounting assembly for mounting an actuator having a cap end and a piston end on an item of equipment. The preferred mounting assembly comprises a base that is mounted to the item of equipment at a first location and has a base pivoting plate hole and a base locking pin hole that is spaced apart from the base pivoting plate hole. The preferred mounting assembly also comprises a pivoting plate having a pivoting plate base hole, a pivoting plate locking pin hole that is spaced apart from the pivoting plate base hole, and a pivoting plate actuator hole that is spaced apart from the pivoting plate locking pin hole. The preferred mounting assembly further comprises a base pin that is disposed in the pivoting plate base hole, a locking pin that is adapted to be removably disposed in the pivoting plate locking pin hole, and an actuator pin that is disposed in the pivoting plate actuator hole and has a longitudinal axis. In the preferred mounting assembly, the pivoting plate is pivotally connected to the base at the base pivoting plate hole, the cap end of the actuator is pivotally connected to the pivoting plate at the pivoting plate actuator hole, the piston end of the actuator is pivotally connected to the item of equipment at a second location, and the base locking pin hole and the pivoting plate locking pin hole are adapted to be aligned when the locking pin is inserted therethrough.

The method of the invention comprises providing an actuator mounting assembly. The preferred mounting assembly comprises a base that is mounted to the item of equipment at a first location and has a base pivoting plate hole and a base locking pin hole that is spaced apart from the base pivoting plate hole. The preferred mounting assembly also comprises a pivoting plate having a pivoting plate base hole, a pivoting plate locking pin hole that is spaced apart from the pivoting plate base hole, and a pivoting plate actuator hole that is spaced apart from the pivoting plate locking pin hole. The preferred mounting assembly further comprises a base pin that is disposed in the pivoting plate base hole, a locking pin that is adapted to be removably disposed in the pivoting plate locking pin hole, and an actuator pin that is disposed in the pivoting plate actuator hole and has a longitudinal axis. In the preferred mounting assembly, the pivoting plate is pivotally connected to the base at the base pivoting plate hole, the cap end of the actuator is pivotally connected to the pivoting plate at the pivoting plate actuator hole, the piston end of the actuator is pivotally connected to the item of equipment at a second location, and the base locking pin hole and the pivoting plate locking pin hole are adapted to be aligned when the locking pin is inserted therethrough. The preferred method also comprises pivotally moving the pivoting plate.

BRIEF DESCRIPTION OF THE DRAWINGS

The presently preferred embodiments of the invention are illustrated in the accompanying drawings, in which like reference numerals represent like parts throughout, and in which:

FIG. 7 is a front view of the preferred actuator pin of the preferred mounting assembly illustrated in FIGS. 1-6A.

FIG. 7A is a left side view of preferred actuator pin of the preferred mounting assembly illustrated in FIG. 1-7.

FIG. 7B is a top view of the preferred actuator pin of the preferred mounting assembly illustrated in FIGS. 1-7A.

DESCRIPTION OF THE PREFERRED EMBODIMENTS OF THE INVENTION

Figure 1:
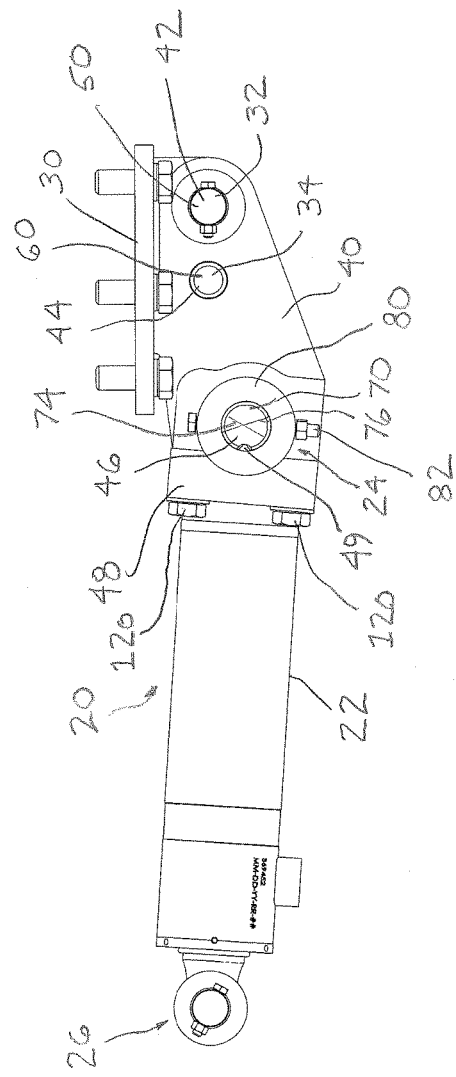
FIG. 1 is a front view of the preferred embodiment of the actuator mounting assembly in accordance with the present invention shown in the "pinned" position.

Referring now to the drawings, the preferred embodiment of the actuator mounting assembly in accordance with the present invention is illustrated by FIGS. 1 through 8. As shown in FIGS. 1-8, the preferred actuator mounting assembly is adapted to minimize, if not eliminate, failures and has a longer lifespan. The preferred embodiments of the mounting assembly also function as both a tension system with an uncrushable release and a pitman service system. The preferred mounting assembly is also less complex, less expensive, and less difficult to service.

Referring now to FIG. 1, a front view of the preferred embodiment of the actuator mounting assembly in accordance with the present invention is illustrated in the "pinned" position. As shown in FIG. 1, the preferred mounting assembly is designated generally by reference numeral 20. Preferred mounting assembly 20 is adapted to mount actuator 22 having cap end 24 and piston end 26 on an item of equipment such as a rock crusher. Preferred actuator 22 is adapted to move between a retracted position and an extended position. Preferred mounting assembly 20 comprises base 30 which is adapted to be mounted at a first location to the item of equipment on which actuator 22 is to be mounted. Preferred base 30 comprises base pivoting plate hole 32 and base locking pin hole 34. Preferably, base locking pin hole 34 is spaced apart from base pivoting plate hole 32.

Still referring to FIG. 1, preferred mounting assembly 20 also comprises pivoting plate 40. Preferably, mounting assembly 20 comprises a pair of pivoting plates 40 that are spaced apart from each other. See FIG. 1A. Preferred pivoting plate 40 comprises pivoting plate base hole 42, pivoting plate locking pin hole 44, and pivoting plate actuator hole 46. Preferred pivoting plate locking pin hole 44 is spaced apart from the pivoting plate base hole 42, and preferred pivoting plate actuator hole 46 is spaced apart from pivoting plate locking pin hole 44. Preferably, pivoting plate 40 is pivotally connected to base 30 at base pivoting plate hole 32. Preferred pivoting plate further comprises rocker block 48 having raised portion 49. See also FIG. 7.

Still referring to FIG. 1, preferred mounting assembly 20 also comprises base pin 50. Preferred base pin 50 is disposed in pivoting plate base hole 42 and base pivoting plate hole 32. Preferred mounting assembly 20 further comprises locking pin 60. Preferred locking pin 60 is adapted to be removably disposed in pivoting plate locking pin hole 44 and base locking pin hole 32. Preferably, base locking pin hole 34 and pivoting plate locking pin hole 44 are adapted to be aligned when locking pin 60 is inserted therethrough. Preferred mounting assembly 20 still further comprises actuator pin 70. Preferred actuator pin 70 is disposed in pivoting plate actuator hole 46 and has longitudinal axis 72 and actuator pin diameter 74. See FIGS. 1A and 7-7C. Preferred pivoting plate actuator hole 46 has pivoting plate actuator hole diameter 76 that is larger than actuator pin diameter 74. Preferably, cap end 24 of actuator 22 is pivotally connected to pivoting plate 40 at pivoting plate actuator hole 46, piston end 26 of actuator 22 is pivotally connected to the item of equipment at a second location, and the second location of the item of equipment is adapted to move relative to the first location of the item of equipment.

Still referring to FIG. 1, preferred mounting assembly further comprises collar 80 which is disposed on an end of actuator pin 70, and collar bolt 82 which is adapted to attach the collar to the actuator pin. While FIG. 1 illustrates the preferred configuration and arrangement of the actuator mounting assembly, it is contemplated within the scope of the invention that the actuator mounting assembly may be of any suitable configuration and arrangement.

Figure 1A:
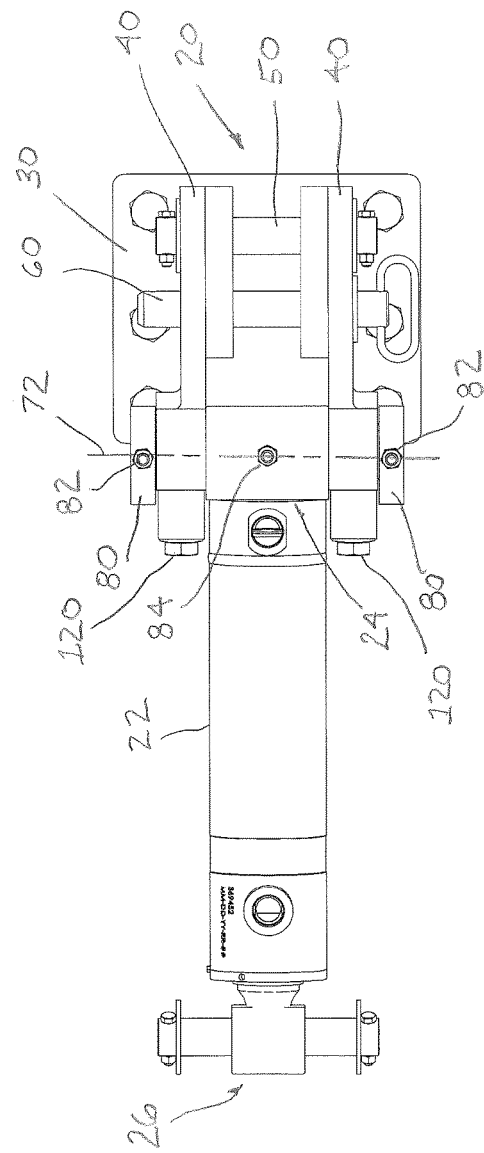
FIG. 1A is a bottom view of the preferred actuator mounting assembly illustrated in FIG. 1.

Referring now to FIG. 1A, a bottom view of preferred actuator mounting assembly 20 is illustrated. As shown in FIG. 1A, preferred mounting assembly 20 comprises actuator 22 having cap end 24 and piston end 26, base 30, pivoting plates 40, base pin 50, locking pin 60, collars 80, collar bolts 82, and actuator bolt 84 which is adapted to affix the actuator pin to the cap end of the actuator.

Figure 2:
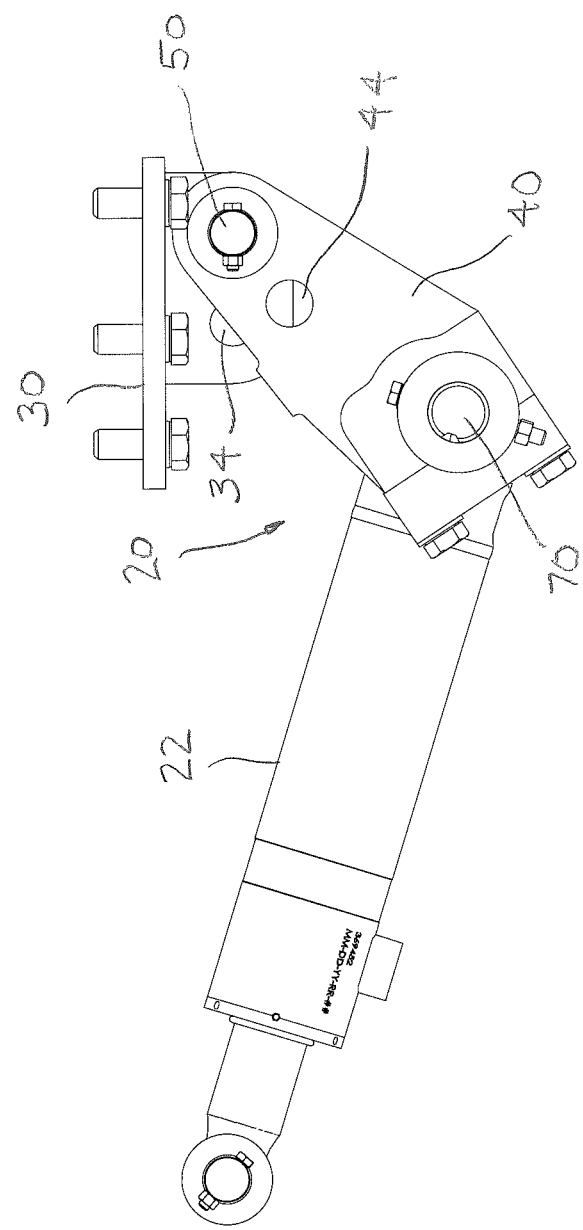
FIG. 2 is a front view of the preferred actuator mounting assembly illustrated in FIGS. 1-1A shown in an "unpinned" position.

Referring now to FIG. 2, a front view of preferred actuator mounting assembly 20 is illustrated in an "unpinned" position. As shown in FIG. 2, the actuator end of the pivoting plate 40 is adapted to pivotally move away from base 30 when locking pin 60 is removed from base locking pin hole 34 and pivoting plate locking pin hole 44. Preferably, locking pin 60 is removed from base locking pin hole 34 and pivoting plate locking pin hole 44 during normal operation of the item of equipment. See FIG. 3. In such case, preferred mounting assembly 20 is adapted to move into the illustrated position in the event of a failure or an uncrushable release in the item of equipment, and thereby minimize, if not eliminate, damage to the actuator and other parts of the mounting assembly.

Figure 3:
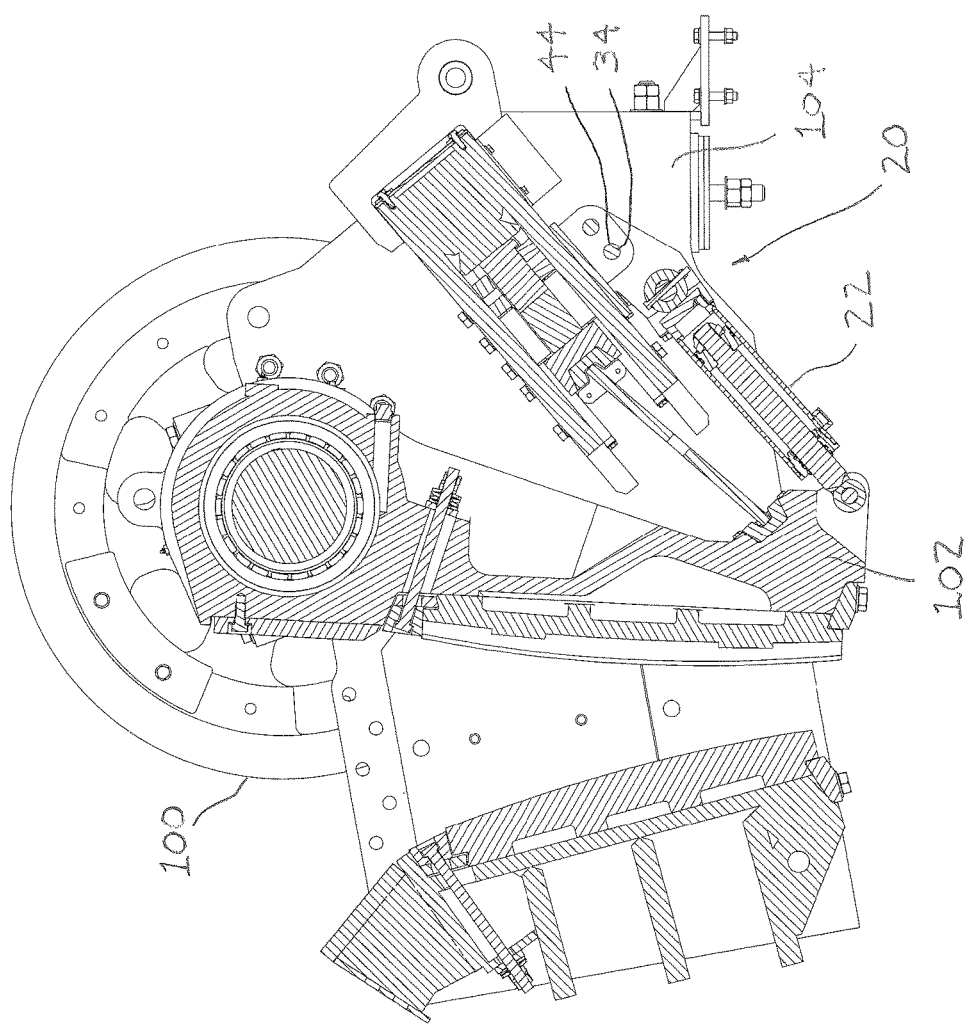
FIG. 3 is a partial sectional view of the preferred actuator mounting assembly illustrated in FIGS. 1-2 shown on an exemplary rock crusher in an "operating" position.

Referring now to FIG. 3, a partial sectional view of preferred actuator mounting assembly 20 is illustrated on an exemplary rock crusher in an "operating" position. As shown in FIG. 3, exemplary rock crusher is designated generally by reference numeral 100. When rock crusher 100 is operating, the locking pin is removed from base locking pin hole 34 and pivoting plate locking pin hole 44, and actuator 22 is in a retracted position pulling pitman 102 toward stationary frame 104.

Figure 4:
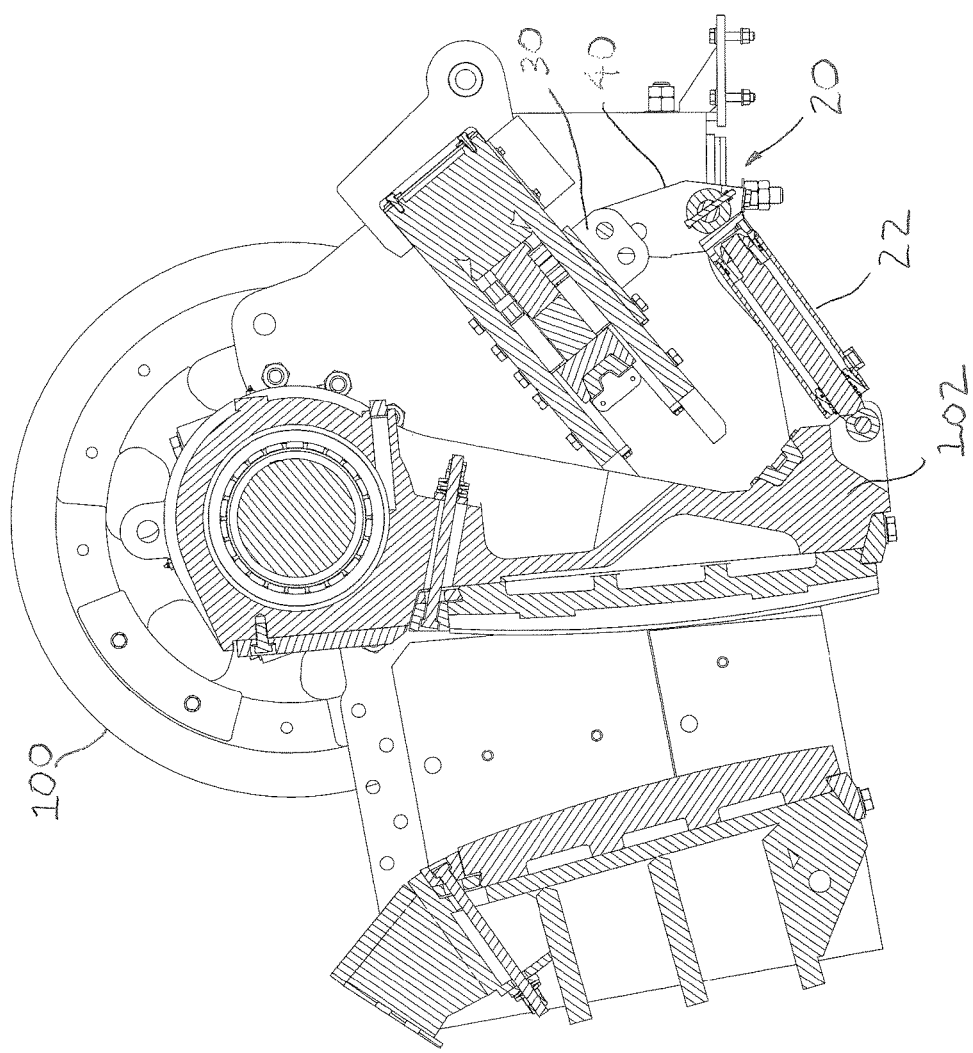
FIG. 4 is a partial sectional view of the preferred actuator mounting assembly illustrated in FIGS. 1-3 shown in an "uncrushable release" position.

Referring now to FIG. 4, a partial sectional view of preferred actuator mounting assembly 20 is illustrated in an "uncrushable release" position. As shown in FIG. 4, in a failure or an uncrushable release event, pitman 102 moves toward mounting assembly 20 with great force. In order to reduce damage to actuator 22 and the other parts of mounting assembly 20, the actuator end of the pivoting plate 40 pivots away from base 30 as pitman 102 moves toward the assembly.

Figure 5:
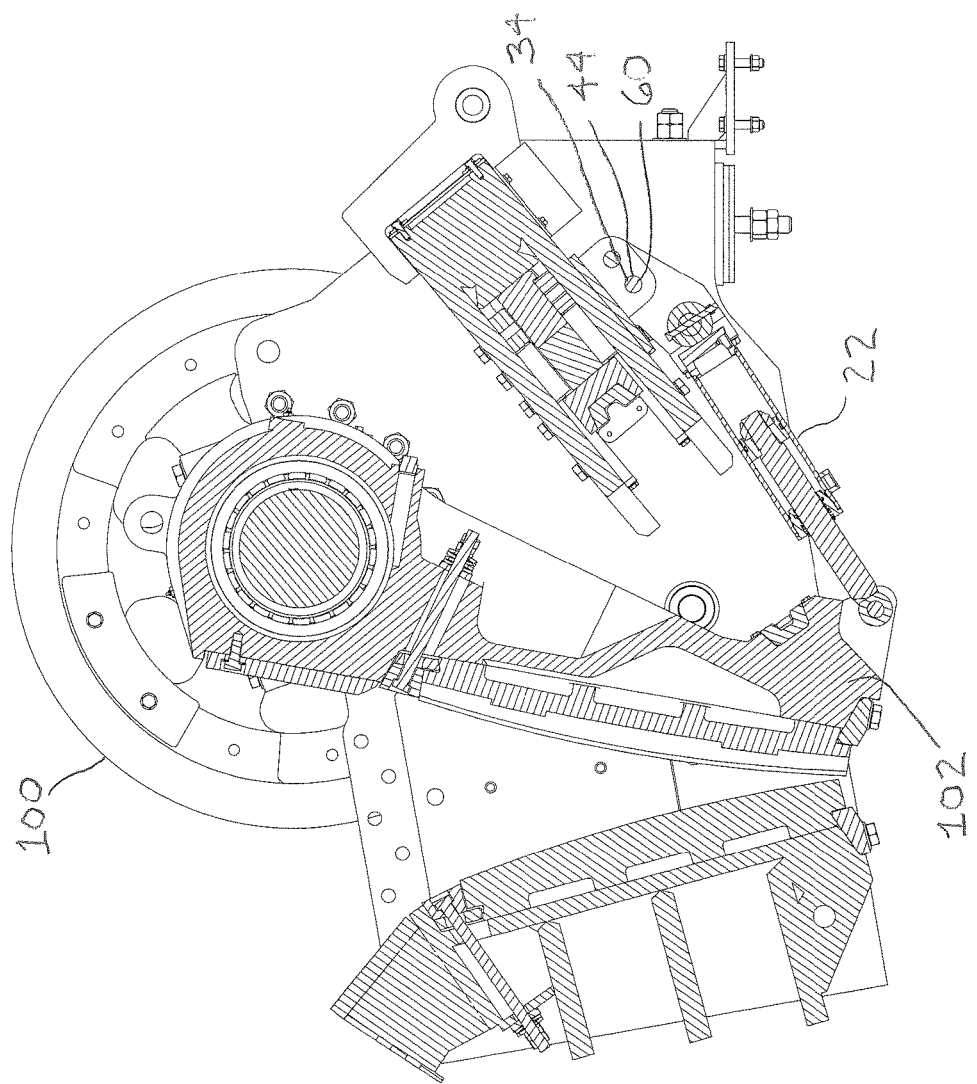
FIG. 5 is a partial sectional view of the preferred actuator mounting assembly illustrated in FIGS. 1-4 shown in a "servicing" position.

Referring now to FIG. 5, a partial sectional view of preferred actuator mounting assembly 20 is illustrated in a "servicing" position. As shown in FIG. 5, when mounting assembly 20 is in the "servicing" position, locking pin 60 is inserted into base locking pin hole 34 and pivoting plate locking pin hole 44 and actuator 22 is in an extended position.

Figures 6, 6A:
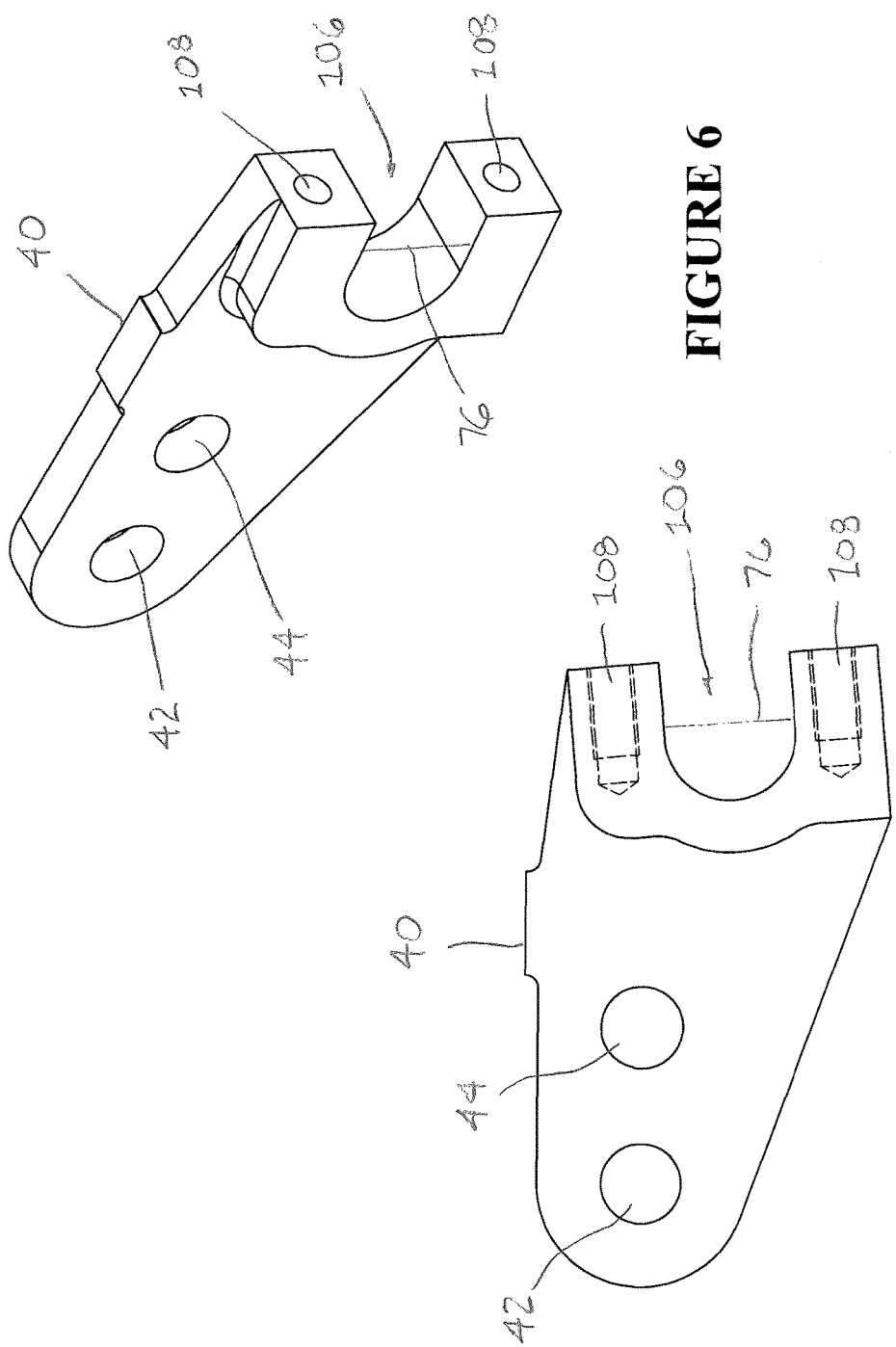
FIG. 6 is a perspective view of the preferred pivoting plate of the preferred mounting assembly illustrated in FIGS. 1-5.
FIG. 6A is a front view of the preferred pivoting plate of the preferred mounting assembly illustrated in FIGS. 1-6.

Referring now to FIG. 6, a perspective view of preferred pivoting plate 40 of preferred mounting assembly 20 is illustrated. As shown in FIG. 6, preferred pivoting plate comprises plate channel 106 which in part defines plate actuator hole 46. Preferred plate actuator hole 46 is further defined by rocker block 48. See FIGS. 7-8. Preferred plate channel 106 also defines actuator hole diameter 76. See FIG. 6A. Preferred pivoting plate 40 further comprises plate base hole 42, plate locking pin hole 44, and plate bolt holes 108 which are adapted to receive rocker block bolts 120 for removably attaching rocker block 48 to the pivoting plate. While FIG. 6 illustrates the preferred configuration and arrangement of the pivoting plate, it is contemplated within the scope of the invention that the pivoting plate may be of any suitable configuration and arrangement.

Referring now to FIG. 6A, a front view of preferred pivoting plate 40 of preferred mounting assembly 20 is illustrated. As shown in FIG. 6A, preferred pivoting plate 40 comprises plate base hole 42, plate locking pin hole 44, actuator hole diameter 76, plate channel 106, and plate bolt holes 108.

Referring now to FIG. 7, a front view of preferred actuator pin 70 of preferred mounting assembly 20 is illustrated. As shown in FIG. 7, preferred actuator pin 70 comprises a plurality of channels 110 which are spaced apart from each other. While FIG. 7 illustrates the preferred configuration and arrangement of the actuator pin, it is contemplated within the scope of the invention that the actuator pin may be of any suitable configuration and arrangement.

Referring now to FIG. 7A, a left side view of preferred actuator pin 70 of preferred mounting assembly 20 is illustrated. As shown in FIG. 7A, preferred actuator pin 70 comprises channel 110.

Referring now to FIG. 7B, a top view of preferred actuator pin 70 of preferred mounting assembly 20 is illustrated. As shown in FIG. 7B, preferred actuator pin 70 comprises actuator pin bolt hole 112 which is adapted to receive actuator bolt 84 for securing the actuator pin to actuator 22. Preferred actuator pin 70 also comprises a pair of actuator pin collar bolt holes 114 which are adapted to receive collar bolts 82.

Figure 7C:
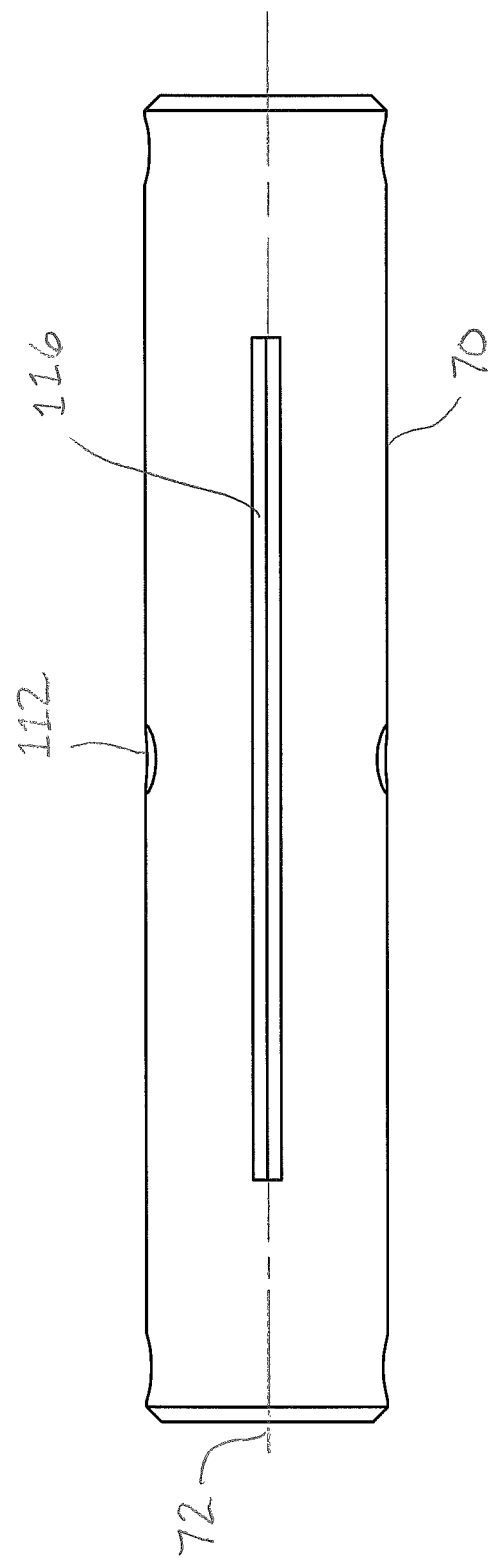
FIG. 7C is a back view of the preferred actuator pin of the preferred mounting assembly illustrated in FIGS. 1-7B.

Referring now to FIG. 7C, a back view of preferred actuator pin 70 of preferred mounting assembly 20 is illustrated. As shown in FIG. 7C, preferred actuator pin 70 comprises groove 116 which is disposed along longitudinal axis 72 and adapted to convey a lubricant to cap end 24 of actuator 22.

Figure 8:
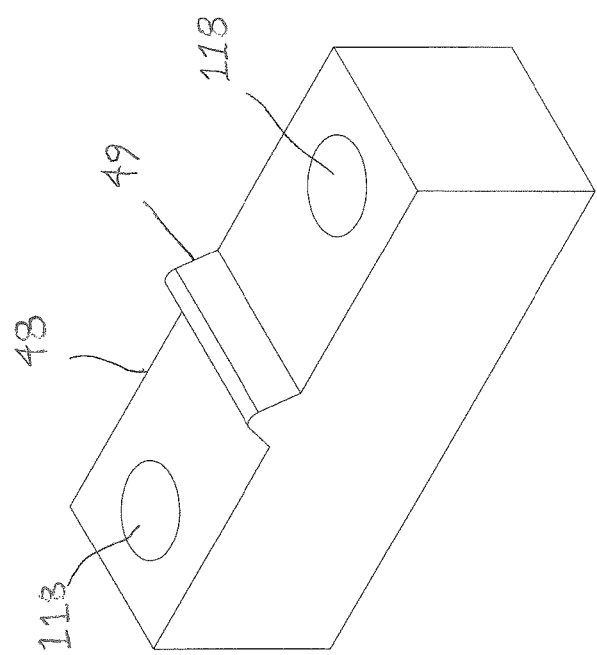
FIG. 8 is a perspective view of the preferred rocker block of the preferred mounting assembly illustrated in FIGS. 1-7C.

Referring now to FIG. 8, a perspective view of preferred rocker block 48 is illustrated. As shown in FIG. 8, preferred rocker block 48 comprises raised portion 49 which is adapted to operatively interact with channel 110 of actuator pin 70. Preferred rocker block 48 also comprises rocker block bolt holes 118 which are adapted to receive rocker block bolts 120. While FIG. 8 illustrates the preferred configuration and arrangement of the rocker block, it is contemplated within the scope of the invention that the rocker block may be of any suitable configuration and arrangement.

Figure 8A:
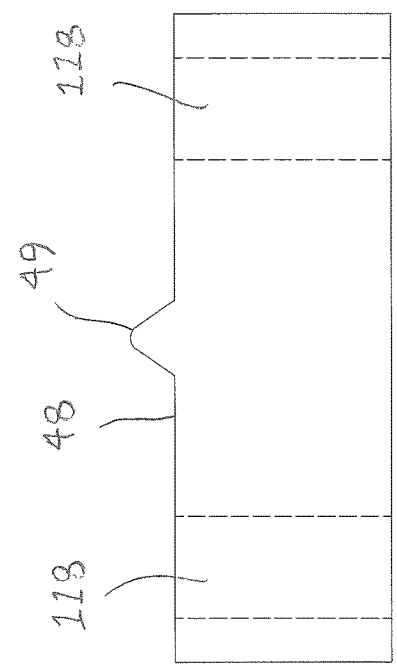
FIG. 8A is a front view of the preferred rocker block of the preferred mounting assembly illustrated in FIGS. 1-8.

Referring now to FIG. 8A, a front view of preferred rocker block 48 is illustrated. As shown in FIG. 8A, preferred rocker block 48 comprises raised portion 49 and rocker block bolt holes 118.

Figure 9:
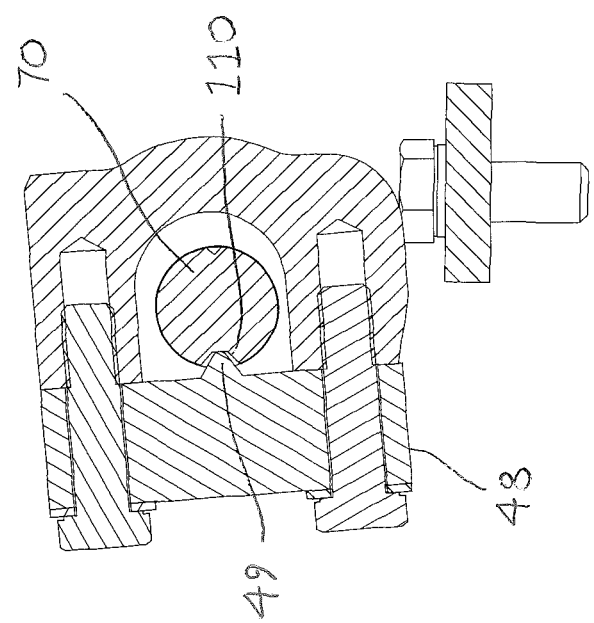
FIG. 9 is a partial sectional view of the preferred actuator pin and rocker block of the preferred mounting assembly illustrated in FIGS. 1-8A.

Referring now to FIG. 9, a partial sectional view of preferred actuator pin 70 and preferred rocker block 48 of preferred mounting assembly 20 is illustrated. As shown in FIG. 9, channel 110 of actuator pin 70 is adapted to seat on raised portion 49 of rocker block 48. More particularly, preferred actuator pin 70 is adapted to move between an "up" position and a "down" position relative to raised portion 49 of rocker block 48 as the eccentric shaft of the rock crusher rotates causing the pitman to move between an "open" position and a "closed" position which causes the actuator to move between an extended position and a retracted position.

The invention also comprises a method for mounting an actuator to an item of equipment such as a rock crusher. The preferred method comprises providing an actuator mounting assembly as described and claimed herein. The preferred method further comprises pivotally moving the pivoting plate. More particularly, the pivoting plate pivotally moves from the normal operation ("up") position to the uncrushable release ("down") position in the event of a failure or an uncrushable release incident. Alternatively, the pivoting plate pivotally moves from the "down" position to the "up" position in order to insert the locking pin into the base locking pin hole and the pivoting plate locking pin hole and extend the actuator to the extended position for purposes of servicing the rock crusher.

In operation, several advantages of the preferred embodiments of the apparatus and method for an actuator mounting assembly are achieved. For example, the preferred embodiments of the actuator mounting assembly are adapted to minimize, if not eliminate, failures and have a longer lifespan. The preferred embodiments of the mounting assembly also function as both a tension system with an uncrushable release and a pitman service system. The preferred embodiments of the actuator mounting assembly are also less complex, less expensive, and less difficult to service.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A mounting assembly for mounting an actuator having a cap end and a piston end on an item of equipment, said mounting assembly comprising:
   (a) a base, said base being fixedly mounted to the item of equipment at a first location and comprising:
      (i). a base pivoting plate hole; and
      (ii). a base locking pin hole, said base locking pin hole being spaced apart from the base pivoting plate hole;
   (b) a pivoting plate, said pivoting plate comprising:
      (i). a pivoting plate base hole;
      (ii). a pivoting plate locking pin hole, said pivoting plate locking pin hole being spaced apart from the pivoting plate base hole; and (iii). a pivoting plate actuator hole, said pivoting plate actuator hole being spaced apart from the pivoting plate locking pin hole;

(c) a base pin, said base pin being disposed in the pivoting plate base hole;

(d) a locking pin, said locking pin being adapted to be removably disposed in the pivoting plate locking pin hole;

(e) an actuator pin, said actuator pin being disposed in the pivoting plate actuator hole and having a longitudinal axis;

wherein the pivoting plate is pivotally connected to the base at the base pivoting plate hole; and wherein the cap end of the actuator is pivotally connected to the pivoting plate at the pivoting plate actuator hole; and wherein the piston end of the actuator is pivotally connected to the item of equipment at a second location; and wherein the base locking pin hole and the pivoting plate locking pin hole are adapted to be aligned when the locking pin is inserted therethrough; and wherein the pivoting plate is adapted to be locked to the base.

2. The mounting assembly of claim 1 wherein the actuator is adapted to move between a retracted position and an extended position.

3. The mounting assembly of claim 1 wherein the second location of the item of equipment is adapted to move relative to the first location of the item of equipment.

4. The mounting assembly of claim 1 wherein the pivoting plate comprises at least two pivoting plates.

5. The mounting assembly of claim 4 wherein the at least two pivoting plates are spaced apart from each other.

6. A mounting assembly for mounting an actuator having a cap end and a piston end on an item of equipment, said mounting assembly comprising:

(a) a base, said base being mounted to the item of equipment at a first location and comprising:
(i). a base pivoting plate hole; and
(ii). a base locking pin hole, said base locking pin hole being spaced apart from the base pivoting plate hole;

(b) a pivoting plate, said pivoting plate comprising:
(i). a pivoting plate base hole;
(ii). a pivoting plate locking pin hole, said pivoting plate locking pin hole being spaced apart from the pivoting plate base hole; and
(iii). a pivoting plate actuator hole, said pivoting plate actuator hole being spaced apart from the pivoting plate locking pin hole;

(c) a base pin, said base pin being disposed in the pivoting plate base hole;

(d) a locking pin, said locking pin being adapted to be removably disposed in the pivoting plate locking pin hole;

(e) an actuator pin, said actuator pin being disposed in the pivoting plate actuator hole and having a longitudinal axis;

wherein the pivoting plate is pivotally connected to the base at the base pivoting plate hole; and wherein the cap end of the actuator is pivotally connected to the pivoting plate at the pivoting plate actuator hole; and wherein the piston end of the actuator is pivotally connected to the item of equipment at a second location; and wherein the base locking pin hole and the pivoting plate locking pin hole are adapted to be aligned when the locking pin is inserted therethrough; and wherein the locking pin is removed from the base locking pin hole and the pivoting plate locking pin hole when the item of equipment is operating.

7. The mounting assembly of claim 1 wherein the actuator is in a retracted position when the item of equipment is operating.

8. The mounting assembly of claim 1 wherein the locking pin is inserted into the base locking pin hole and the pivoting plate locking pin hole when the item of equipment is being serviced.

9. The mounting assembly of claim 1 wherein the actuator is in an extended position when the item of equipment is being serviced.

10. The mounting assembly of claim 6 wherein the pivoting plate is adapted to pivotally move away from the base in the event of an uncrushable release in the item of equipment.

11. The mounting assembly of claim 1 wherein the pivoting plate actuator hole comprises a pivoting plate actuator hole diameter that is larger than the actuator pin diameter.

12. The mounting assembly of claim 1 wherein the actuator pin comprises a plurality of channels.

13. The mounting assembly of claim 12 wherein the plurality of channels comprise a pair of channels that are spaced apart from each other.

14. The mounting assembly of claim 6 wherein the actuator pin comprises a groove disposed along the longitudinal axis.

15. The mounting assembly of claim 14 wherein the groove is adapted to convey a lubricant to the cap end of the actuator.

16. The mounting assembly of claim 6 wherein the actuator pin comprises actuator pin bolt hole.

17. The mounting assembly of claim 6 further comprising an actuator bolt, said actuator bolt being adapted to affix the actuator pin to the cap end of the actuator.

18. The mounting assembly of claim 6 further comprising a collar, said collar being disposed on an end of the actuator pin.

19. The mounting assembly of claim 18 further comprising a collar bolt, said collar bolt being adapted to attach the collar to the actuator pin.

20. A method for mounting an actuator to an item of equipment, said method comprising:

(a) providing an actuator mounting assembly, said actuator mounting assembly comprising:
(1) a base, said base being fixedly mounted to the item of equipment at a first location and comprising:
(i) a base pivoting plate hole; and
(ii) a base locking pin hole, said base locking pin hole being spaced apart from the base pivoting plate hole;
(2) a pivoting plate, said pivoting plate comprising:
(i) a pivoting plate base hole;
(ii) a pivoting plate locking pin hole, said pivoting plate locking pin hole being spaced apart from the pivoting plate base hole; and
(iii) a pivoting plate actuator hole, said pivoting plate actuator hole being spaced apart from the pivoting plate locking pin hole;
(3) a base pin, said base pin being disposed in the pivoting plate base hole;
(4) a locking pin, said locking pin being adapted to be removably disposed in the pivoting plate locking pin hole;

(5) an actuator pin, said actuator pin being disposed in the pivoting plate actuator hole and having a longitudinal axis;

wherein the pivoting plate is pivotally connected to the base at the pivoting plate base hole; and wherein the cap end of the actuator is pivotally connected to the pivoting plate at the pivoting plate actuator hole; and wherein the piston end of the actuator is pivotally connected to the item of equipment at a second location; and wherein the base locking pin hole and the pivoting plate locking pin hole are adapted to be aligned when the locking pin is inserted therethrough; and wherein the pivoting plate is adapted to be locked to the base;

(b) pivotally moving the pivoting plate.

* * * * *